UNITED STATES PATENT OFFICE.

CHARLES V. BACON, OF NEW YORK, N. Y., AND JOHN M. WILSON, OF MONTCLAIR, NEW JERSEY, ASSIGNORS TO WILSON REMOVER COMPANY, OF NEW YORK, N. Y., A CORPORATION OF NEW JERSEY.

FINISH-REMOVER AND PROCESS OF MAKING SAME.

1,167,469.  
Specification of Letters Patent.  
Patented Jan. 11, 1916.

No Drawing.  Application filed September 5, 1912.  Serial No. 718,620.

*To all whom it may concern:*

Be it known that we, CHARLES V. BACON and JOHN M. WILSON, citizens of the United States, residing in New York city, county and State of New York, and Montclair, Essex county, New Jersey, respectively, have invented new and useful Improvements in Finish-Removers and Processes of Making Same, of which the following is a specification.

This invention relates to improvements in that class of paint and varnish removers containing highly volatile solvents known as non-neutral waxy removers and has for its object the production of an emulsion-remover which is capable of remaining unchanged physically when confined irrespective of the length of time the same is allowed to stand and which is withal both efficient and economical. Heretofore it has been proposed to incorporate in excess of 33% of waxy bodies with the highly volatile solvents to form such removers. Such mixtures while neutral, *i. e.*, free from carbolic acid (commonly considered as an acid) or other acids such as acetic, for example, possess many objectionable features among which are the relatively poor cutting qualities, of the same, the enormous percentage of waxy material contained therein and the difficulty of after cleaning the surfaces subjected to the actions of such compositions.

We have discovered that a highly efficient remover can be prepared from volatile solvents such as alcoholic or ketonic finish solvents and benzolic or equivalent hydrocarbon wax solvents by incorporating therewith but an extremely small percentage of a thickening material and a relatively high percentage, as compared with the percentage of wax, of a true acid such as acetic for example.

An especially important feature also of our invention is the employment of vegetable waxy bodies such as palm wax or candelilla wax, or waxy substances reacting with acetic acid like palm-wax, in conjunction with volatile waxy solvents and wax precipitants and also a colloiding agent such as acetic or formic gallotannic and like organic acids, capable of similar action and also the aldehydes or anhydrids of such acids, preferably those which are low in the series and behave similar to formic acid or acetic acid. The reaction between these so-called vegetable waxes and the acid colloiding or flocculating agent is unique and is entirely different from that between ordinary paraffin or true waxes as beeswax and other well known waxes heretofore employed, or between these same vegetable waxes and phenol, commonly known as carbolic acid. It has been found that in the presence of such colloiding agents, the extremely insignificant amount of 2% of the total weight of the remover constitutes a sufficient amount of wax to render the remover sufficiently thick for all ordinary purposes, even preventing the running of the same when applied to vertical surfaces. Moreover, this colloiding action insures the permanent suspension of the wax in the volatile solvents and the presence of crystalline particles in the same is virtually eliminated.

In addition to the action of the acid as a colloiding agent, it also serves as an extremely effective solvent for finish the same having a far greater power of disintegration of weathered or dried films of linseed oil paints or resinous varnishes, or the like, than have the ordinary voltile finish or wax solvents by themselves. The action of acetic acid, or an equivalent acid having similar properties, upon a linseed oil paint, particularly so-called lead paints, is extremely energetic and apparently there is a direct chemical action between acetic acid and the lead oxids, sulfates, or other compounds, with the result that this supplemental action of these said acids permits the finish solvents to more readily penetrate the film of finish.

An example of our invention, as preferably carried out is as follows: benzol (benzene), 44; methyl acetone, 44; concentrated formic or glacial acetic acid, 10; vegetable so-called waxes such as palm wax or candlelilla wax, 2.

The benzol, acetone or alcohol are preferably first mixed and heated, and the wax is then dissolved therein while still hot. The acetic or other acid is then added to this solution of wax and the whole mixture allowed to cool naturally.

In the foregoing composition while phenol is preferably omitted, yet owing to its non-volatile properties, as described in the patent to John M. Wilson, of August 27, 1912, No. 1,036,946, the same may be employed and the proportions of the volatile finish solvents, particularly benzol and alcohol, may be correspondingly decreased to correspond.

Obviously, the consistency of the composition can be optionally varied, as desired, by changing the relative proportions of solvents, or in any other desired manner, and as above stated, various homologous compounds, such as anhydrids of the acids employed, including for example acetic anhydrid which are capable of being substituted therefor with substantially the same effect, may be employed in lieu thereof. Various waxes such as candelilla may be substituted for palm wax, and similar waxes, which are affected by acetic acid in a similar manner, may also be employed in lieu thereof. Among the additional advantages of the employment of these vegetable waxes, such as those herein described, is the elimination of relatively soft waxes such as paraffin and greasy waxes such as beeswax and the like which are substantially unaffected by acetic acid or its homologues. In fact the action of the acids herein mentioned, such as acetic for example, upon the waxes such for example as palm wax, results apparently in the transformation of the said wax into what may be termed a transformed physical condition, the same being obtainable as a substantially dry film on the evaporation of volatile solids from these removers. Paraffin and true waxes, such as beeswax and the like, on the other hand, even though subjected to the same solvents, including the acids herein mentioned, remain upon evaporation of the solvents in substantially their original physical condition possessing all the peculiar characteristics of a wax. As a result of the transformation of our waxes as stated, it is possible to easily cleanse the surface from the dried removers and thorough cleansing of the surface from such powdered substances is not essential, as the same, owing to its non-waxy nature, seems to act as a filler and to have no deleterious action upon subsequent coats of paint or varnish applied to such surface when relatively small amounts of said converted vegetable wax is allowed to remain upon the surface.

Having thus described our invention, what we claim and desire to secure by Letters Patent is:

1. The process of making a finish remover which consists in incorporating a substantial amount, and in excess of 1% of the finish remover, of a water-soluble gelatinizing acid with a wax having substantially the same reaction therewith as that of palm wax, and suitable finish solvents including a wax solvent.

2. The process of making a finish remover, which consists in subjecting a vegetable wax to the action of a substantial amount, and in excess of 1% of the finish remover, of a water-soluble organic compound containing the radical (COOH) and in the presence of other volatile finish solvents including a solvent of said wax.

3. A finish remover consisting of a substantial amount, and in excess of 1% of the finish remover, of a water-soluble gelatinizing agent, a waxy body having substantially the same reaction therewith as that of palm wax, a volatile finish solvent including a solvent of said wax.

4. A finish remover consisting of a substantial amount, and in excess of 1% of the finish remover, of a water-soluble organic acid containing the radical (COOH) and a waxy body having substantially the same reaction therewith as that of palm wax, and a plurality of organic finish solvents including a wax solvent.

5. A finish remover consisting of a substantial amount, and in excess of 1% of the finish remover, of a water-soluble fatty organic acid and a waxy body having substantially the same reaction therewith as that of palm wax, and a plurality of organic finish solvents including a wax solvent.

6. A finish remover consisting of a substantial amount, and in excess of 1% of the finish remover, of a water-soluble acetic acid and a waxy body having substantially the same reaction therewith as that of palm wax, and a plurality of organic finish solvents including a wax solvent.

7. A finish remover consisting of a substantial amount, and in excess of 1% of the finish remover, of a water-soluble gelatinizing acid or acid derivatives, a waxy body having substantially the same reaction therewith as that of palm wax, and a volatile finish solvent including a solvent of said wax.

8. A finish remover containing a deflocculating agent comprising a substantial amount, and in excess of 1% of the finish remover, of a water-soluble organic acid and a waxy body having substantially the same reaction therewith as that of palm wax, which wax is capable of being isolated from the mixture in the form of a substantially dry powder having little resemblance to wax upon evaporation of the volatile solvents therefrom.

9. A finish remover containing of from 5 to 10% of an organic deflocculating agent, of a water-soluble nature and not in excess of 5% of a wax having substantially the same reaction therewith as that of palm wax.

In witness whereof, we have hereunto set our hands at the city, county and State of New York, this 4th day of September, 1912.

CHAS. V. BACON,
JOHN M. WILSON.

Witnesses:
W. H. SWENARTON,
ARTHUR G. H. POWER, Jr.